April 24, 1934.   W. C. VAN GEEL ET AL   1,956,365
ELECTROLYTIC CONDENSER
Filed May 6, 1932
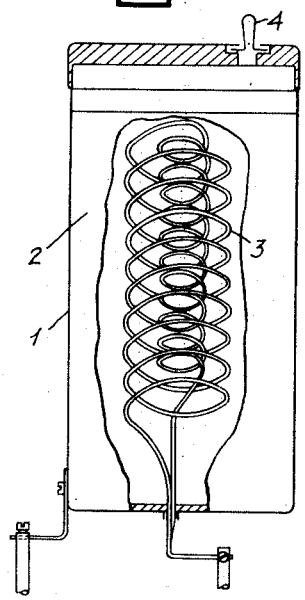
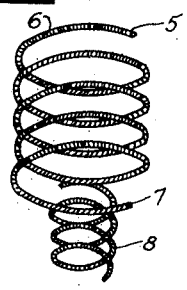
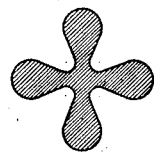
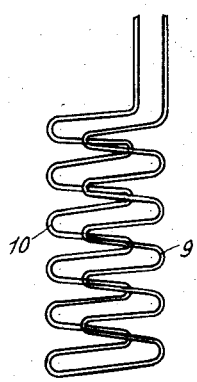
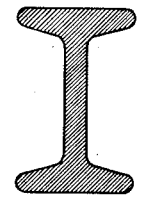
INVENTORS
WILLEM C. VAN GEEL
WILLEM F. STRAUB
BY
ATTORNEY Patented Apr. 24, 1934

1,956,365

UNITED STATES PATENT OFFICE 1,956,365

ELECTROLYTIC CONDENSER

Willem Christiaan van Geel and Willem Frederik Straub, Eindhoven, Netherlands, assignors to Radio Corporation of America, a corporation of Delaware Application May 6, 1932, Serial No. 609,626
In Germany May 2, 1931

2 Claims. (Cl. 175—315)

This invention relates to an electrolytic condenser, i. e. a condenser in which one of the electrodes is coated with an oxide layer and immersed in an electrolyte which together with its supply conductor constitutes the second electrode. Since in such a cell a current may pass in one direction only it may be used as condenser for smoothing direct current. Such a cell has a large capacity which is due to the fact that the insulating metal oxide layer is extremely thin, so that a condenser is obtained in which the distance between the armatures is very small, whereas the metal oxide has a high dielectric constant.

If an electrolytic condenser of this type be used for alternating current, two of such cells must be mounted oppositely thus preventing the passage of a current in any direction.

It has been endeavored to form in such electrolytic condensers a large surface having a small material consumption by using plate-shaped electrodes.

In the condenser according to the invention this principle is entirely deviated from thus obtaining other more important advantages. According to the invention at least one of the electrodes is constituted by a wound wire. By the term "wound" is to be understood that the wire has a number of curvations so as to store a greater wire length in a definite volume.

By using wires the essential advantage is obtained that the current paths of the current supply through the electrolyte to the other electrode only slightly differ in length, in contradistinction to the known plates or cylinders, in which the current paths to the side of the plates turned away from the supply conductors, or to the inner side of the cylinder are much longer than to the front side of the plates or to the outer side of the cylinders, due to which the average resistance of the condenser is materially increased. Owing to the decrease of resistance achieved by using a wound wire, materials having a greater resistance may be used as electrolytes, which materials have often a favorable working.

This is of great importance especially since in the most usual construction of electrolytic condensers the casing containing the electrolyte serves as supply conductor for the electrolyte, so that the current lines must extend from this casing to the various parts of the other electrode placed in the electrolyte.

As compared with plates the wire-shaped electrode has the great advantage that the manufacture is much more simple and less expensive, since plates must always be fixed to supports whereas for the attachment of the wire the ends taken out may be readily used.

Furthermore it has been found that the oxide layer formed on the surface of a wire has excellent properties for use in electrolytic condensers, which results from the fact that no marginal effects occur in such condensers as is the case with plates and cylinders.

The drawback that the surface relatively to the quantity of material is smaller may be easily avoided by clewing up the wire to a more or less extent, so that a large surface may be stored into a definite volume. For reducing the weight a light material, for example, aluminium or an aluminium alloy may be used.

Furthermore a profiled wire is preferably used, so that the surface is increased still further.

For profiling the wire it is advantageous to provide thereon a helically wound second wire which preferably consists of a material analogous to that of the first wire.

In a suitable form of construction the electrode consisting of a wound wire is constituted by a helically wound body whereas preferably a plurality of such helices wound in one piece are located one within the other.

In another suitable form of construction a wire is used which is bent in form of a wave line.

The invention will be more clearly understood by reference to the accompanying drawing, representing, by way of example, some forms of construction thereof.

Fig. 1 shows schematically a condenser having an electrode consisting of two helices one of which is provided within the other.

Fig. 2 shows a part of an electrode, in which for increasing the surface a second wire is helically wound on the first wire.

Fig. 3 shows an electrode wound in form of a wave line.

Figs. 4, 5 and 6 are different profile cross sections of a wire which is provided with unevenesses.

In Fig. 1 the condenser casing consisting for example, of copper, is designated by 1. This casing together with the electrolyte 2 constitutes one electrode. The electrode consists, for example, of an aqueous solution of boric acid, borates, citrates and so forth. In many cases it is advantageous to replace the water entirely or partly by a multivalent alcohol, for example, glycerine. An electrode 3, consisting, for example, of aluminum, is placed in the electrolyte. This electrode is constituted by two helices one of which is located within the other and made of a single wire.

The electrode 3 is taken through the wall at the bottom side of the condenser, so that the electrode is entirely surrounded by the electrolyte. This construction is preferably used while otherwise the electrode is often attacked within the condenser at the point at which it passes through the surface of the liquid. The top of the casing is provided with a valve 4 through which vapors may escape. The valve is constituted, for example, by a rubber cap in which a small aperture is made.

The wire 3 may also be furnished with unevenesses which may be provided as appears from Fig. 2, in which the piece of wire 5 has helically wound on it a second wire 6. Both wires consist, for example, of aluminum. The outer windings are cut at 7 and below these windings part 8 of the inner windings are shown.

Fig. 3 shows an electrode which is wound in form of a wave line and comprises a lead branch 9 and a return branch 10. Of course the wire which is wound as a wave line may also comprise more branches.

The Figs. 4, 5 and 6 show a cross-profile, a U-profile and an I-profile of the wire, whilst of course, various other profiles are possible. Furthermore, the wire may be furnished with longitudinal grooves or with a screw thread, for example.

Finally the wire may be wound so as to form grids of various shapes, if it is rendered possible thereby to store a great wire length in a small volume.

The condenser above referred to may also be used as rectifier, if desired.

We claim:

1. An electrolytic condenser comprising at least two electrodes, terminals for said electrodes for connecting the condenser to any desired electrical network, at least one of said electrodes being formed of a wound wire said wire having helically wound thereon a second wire.

2. In an electrolytic condenser comprising an electrode formed as a container and provided with a terminal, a vapor valve and an electrolyte substance within the container, a second electrode comprising a wound wire immersed in the electrolyte and a terminal for the second electrode insulatingly led through the container electrode, said second electrode comprising a wound wire having helically wound thereon a second wire.

WILLEM CHRISTIAAN VAN GEEL.
WILLEM FREDERIK STRAUB.

CERTIFICATE OF CORRECTION.

Patent No. 1,956,365.                                                      April 24, 1934.

WILLEM CHRISTIAAN VAN GEEL, ET AL.

It is hereby certified that error appears in the printed specification of the above numbered patent requiring correction as follows: Page 1, line 102, for the word "electrode" second occurrence, read electrolyte; and that the said Letters Patent should be read with this correction therein that the same may conform to the record of the case in the Patent Office.

Signed and sealed this 9th day of June, A. D. 1936.

Leslie Frazer (Seal)                                             Acting Commissioner of Patents.